United States Patent
Wei et al.

(10) Patent No.: US 11,892,871 B2
(45) Date of Patent: Feb. 6, 2024

(54) CLOCK SYNCHRONIZATION SYSTEM AND OPERATION METHOD THEREOF CAPABLE OF SYNCHRONIZING OPERATION TIME OF INTERNAL CIRCUITS

(71) Applicant: Realtek Semiconductor Corp., HsinChu (TW)

(72) Inventors: Po-Lin Wei, HsinChu (TW); Ching-Lung Chen, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 73 days.

(21) Appl. No.: 17/684,443

(22) Filed: Mar. 2, 2022

(65) Prior Publication Data

US 2022/0283981 A1    Sep. 8, 2022

(30) Foreign Application Priority Data

Mar. 8, 2021    (TW) .................. 110108127

(51) Int. Cl.
*G06F 1/12*      (2006.01)
*G06F 13/42*     (2006.01)

(52) U.S. Cl.
CPC ............ *G06F 1/12* (2013.01); *G06F 13/4291* (2013.01); *G06F 2213/0016* (2013.01); *G06F 2213/0042* (2013.01)

(58) Field of Classification Search
CPC .................. G06F 1/12; G06F 13/4291; G06F 2213/0016; G06F 2213/0042
See application file for complete search history.

(56) References Cited

U.S. PATENT DOCUMENTS

| | | | | |
|---|---|---|---|---|
| 2004/0008973 | A1* | 1/2004 | Marshall | G06F 1/14 348/497 |
| 2004/0146071 | A1* | 7/2004 | Lee | H04L 7/0012 370/503 |
| 2005/0201421 | A1* | 9/2005 | Bhandari | H04J 3/0682 370/519 |
| 2006/0041773 | A1* | 2/2006 | Otomo | H04N 21/4305 713/503 |
| 2019/0332137 | A1* | 10/2019 | Benjamini | G06F 13/4282 |
| 2020/0019209 | A1* | 1/2020 | Sharpe-Geisler | G06F 13/4291 |

FOREIGN PATENT DOCUMENTS

TW         I720791 B      3/2021

* cited by examiner

*Primary Examiner* — Glenn A. Auve
(74) *Attorney, Agent, or Firm* — Winston Hsu

(57) ABSTRACT

A host circuit includes a first clock generator, a first input output interface, a first communication interface, and a first processor. The first clock generator generates a first clock signal. The first processor outputs a trigger signal through the first input output interface, records a first clock count of the first clock generator at the same time, and outputs the first clock count through the first communication interface. A slave circuit includes a second clock generator, a second input output interface, a second communication interface, and a second processor. The second clock generator generates a second clock signal. When receiving the trigger signal, the second processor records a second clock count of the second clock generator, and calculates a time difference between the first clock signal and the second clock signal according to the first clock count and the second clock count.

18 Claims, 3 Drawing Sheets

CLOCK SYNCHRONIZATION SYSTEM AND OPERATION METHOD THEREOF CAPABLE OF SYNCHRONIZING OPERATION TIME OF INTERNAL CIRCUITS

BACKGROUND OF THE INVENTION

1. Field of the Invention

The present invention relates to a clock synchronization system, particularly a clock synchronization system capable of synchronizing the operation time of internal circuits.

2. Description of the Prior Art

When playing multimedia data, in order to synchronize the actions and sounds in the images, the playback of audio files and image files usually refers to the same clock signal. In the prior art, System on Chip (SoC) is often used to process audio files and image files in multimedia data, so the audio files and image files can be synchronized.

However, as users have higher and higher requirements for the quality of images and sounds, different circuits are often used to process audio files and image files in more detail when processing multimedia data. Since different circuits operate according to different clock signals, how to synchronize the playback time of the two to ensure that the image and sound can match has become a problem to be solved.

SUMMARY OF THE INVENTION

An embodiment discloses a clock synchronization system. The clock synchronization system comprises a host circuit and a slave circuit. The host circuit comprises a first clock generator for generating a first clock signal, a first input output interface, a first communication interface, and a first processor. The first processor is for outputting a trigger signal through the first input output interface, recording a first clock count of the first clock generator simultaneously, and outputting the first clock count from the first communication interface. The slave circuit comprises a second clock generator for generating a second clock signal, a second input output interface coupled to the first input output interface, a second communication interface coupled to the first communication interface, and a second processor. The second processor is for recording a second clock count of the second clock generator when the trigger signal is received from the second input output interface, and calculating a time difference between the first clock signal and the second clock signal according to the first clock count and the second clock count.

Another embodiment discloses an operation method of a clock synchronization system. The clock synchronization system comprises a host circuit and a slave circuit. The host circuit comprises a first clock generator. The slave circuit comprises a second clock generator. The method comprises the first clock generator generating a first clock signal; the second clock generator generating a second clock signal; the host circuit outputting a trigger signal to the slave circuit; when the trigger signal is issued, the host circuit simultaneously recording a first clock count of the first clock generator; the host circuit outputting the first clock count to the slave circuit; when the slave circuit receives the trigger signal, the slave circuit recording a second clock count of the second clock generator; and the slave circuit calculating a time difference between the first clock signal and the second clock signal according to the first clock count and the second clock count.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
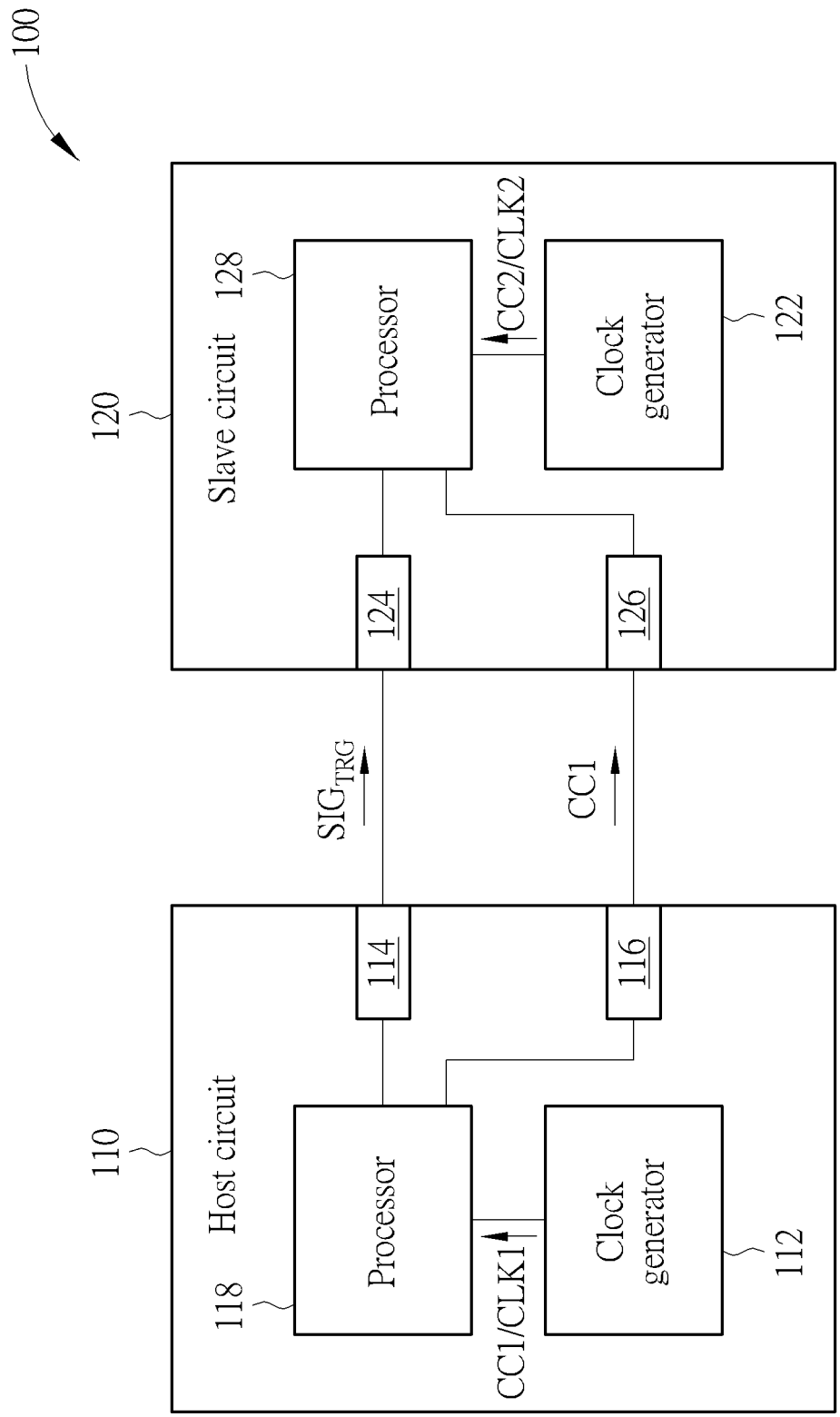
FIG. 1 is a schematic diagram of a clock synchronization system according to an embodiment of the present invention.

FIG. 1 is a schematic diagram of a clock synchronization system 100 according to an embodiment of the present invention. The clock synchronization system 100 comprises a host circuit 110 and a slave circuit 120. In some embodiments, the master circuit 110 can be, for example, a master chip inside a television, and the slave circuit 120 can be a companion chip for processing special images. For example, the host circuit 110 can process image files and audio files. However, the host circuit 110 can only process video images with a resolution of 4K. Therefore, if the user wants to have a higher image quality, for example, when the user wants to display a video image with a resolution of 8K, the slave circuit 120 needs to be used for processing. However, in this case, the audio files are still processed by the host circuit 110, so the internal time of the two must be synchronized to ensure that the corresponding image and audio content can be output simultaneously.

The host circuit 110 may comprise a clock generator 112, an input output interface 114, a communication interface 116, and a processor 118. The clock generator 112 can generate a clock signal CLK1, and the processor 118 can operate according to the clock signal CLK1. The slave circuit 120 may comprise a clock generator 122, an input output interface 124, a communication interface 126, and a processor 128. The clock generator 122 can generate a clock signal CLK2, and the processor 128 can operate according to the clock signal CLK2. The input output interface 124 can be coupled to the input output interface 114, and the communication interface 126 can be coupled to the communication interface 116. In some embodiments, the input output interfaces 114, 124 may be, for example, but not limited to, General Purpose Input/Output (GPIO) interfaces. The communication interfaces 116, 126 may be, for example, but not limited to, universal serial bus (USB) interfaces, Inter-Integrated Circuit (I2C) interfaces or universal asynchronous receiver transmitter (UART) interfaces.

In some embodiments, the host circuit 110 and the slave circuit 120 can perform a time synchronization operation to calculate the time difference between the clock signals CLK1 and CLK2 used by the two, and the slave circuit 120 can backtrack the time of the main control circuit 110 according to the time difference. This enables the multimedia files processed by the two to be played at the same time, thereby synchronizing images and sounds.

In some embodiments, the clock generator 112 may increment the clock count at each rising edge or each falling edge of the clock signal CLK1, such as but not limited to adding 1, to update the clock count CC1. In other words, the clock count CC1 can be used to indicate the number of cycles of the clock signal CLK1, so the processor 118 can determine the internal time according to the clock count CC1. Similarly, the processor 128 also determines the internal time according to the clock count CC2 of the clock signal CLK2. However, since the clock signals CLK1 and CLK2 are not synchronized, there will be a time difference between the internal time of the processor 118 and the internal time of the processor 128.

During the time synchronization operation, the processor 118 may output the trigger signal $SIG_{TRG}$ through the input output interface 114, record the clock count CC1 of the clock generator 112, and output the clock count CC1 through the communication interface 116. The processor 128 may record the clock count CC2 of the clock generator 122 when the trigger signal $SIG_{TRG}$ is received from the input output interface 124. In some embodiments, the processor 118 can transmit the trigger signal $SIG_{TRG}$ by pulling down the voltage of the input output interface 114. When the slave circuit 120 senses the voltage change of the input output interface 124, it can immediately record the current clock count CC2. In other words, the clock count CC1 and the clock count CC2 will correspond to almost the same real time.

The slave circuit 120 can calculate the time difference between the clock signal CLK1 and the clock signal CLK2 according to the clock count CC1 and the clock count CC2. For example, if the clock count CC1 is 100 and the clock count CC2 is 250, the processor 128 may subtract the clock count CC1 from the clock count CC2 to calculate the time difference between the two to be 150. In this way, if the processor 118 hands the multimedia data expected to be played at the first play time to the processor 128 for processing, the processor 128 can add the first play time to the time difference 150 to calculate the second play time of the multimedia data should be played by the processor 128 of the slave circuit 120.

Since the slave circuit 120 in the clock synchronization system 100 can calculate the time difference between the two clock counts CC1 and CC2 at the same real time, when receiving the multimedia data from the host circuit 110, the second play time of the multimedia data in the slave circuit 120 can be backtracked, ensuring that the host circuit 110 and the slave circuit 120 can play the corresponding multimedia data at the same time, thereby synchronizing image and sound.

In FIG. 1, the processor 128 can enter an interrupt mode when receiving the trigger signal $SIG_{TRG}$, and read the clock count CC2 from the clock generator 122 in the interrupt mode. However, in some embodiments, if the processor 128 takes a long time to enter the interrupt mode, it may cause the clock counts CC1 and CC2 to correspond to different real times, resulting in the poor synchronization of the master circuit 110 and the slave circuit 120. In this case, the slave circuit 120 can use other hardware circuits to sense the trigger signal $SIG_{TRG}$, so as to be able to react more immediately when the trigger signal $SIG_{TRG}$ is received.

Figure 2:
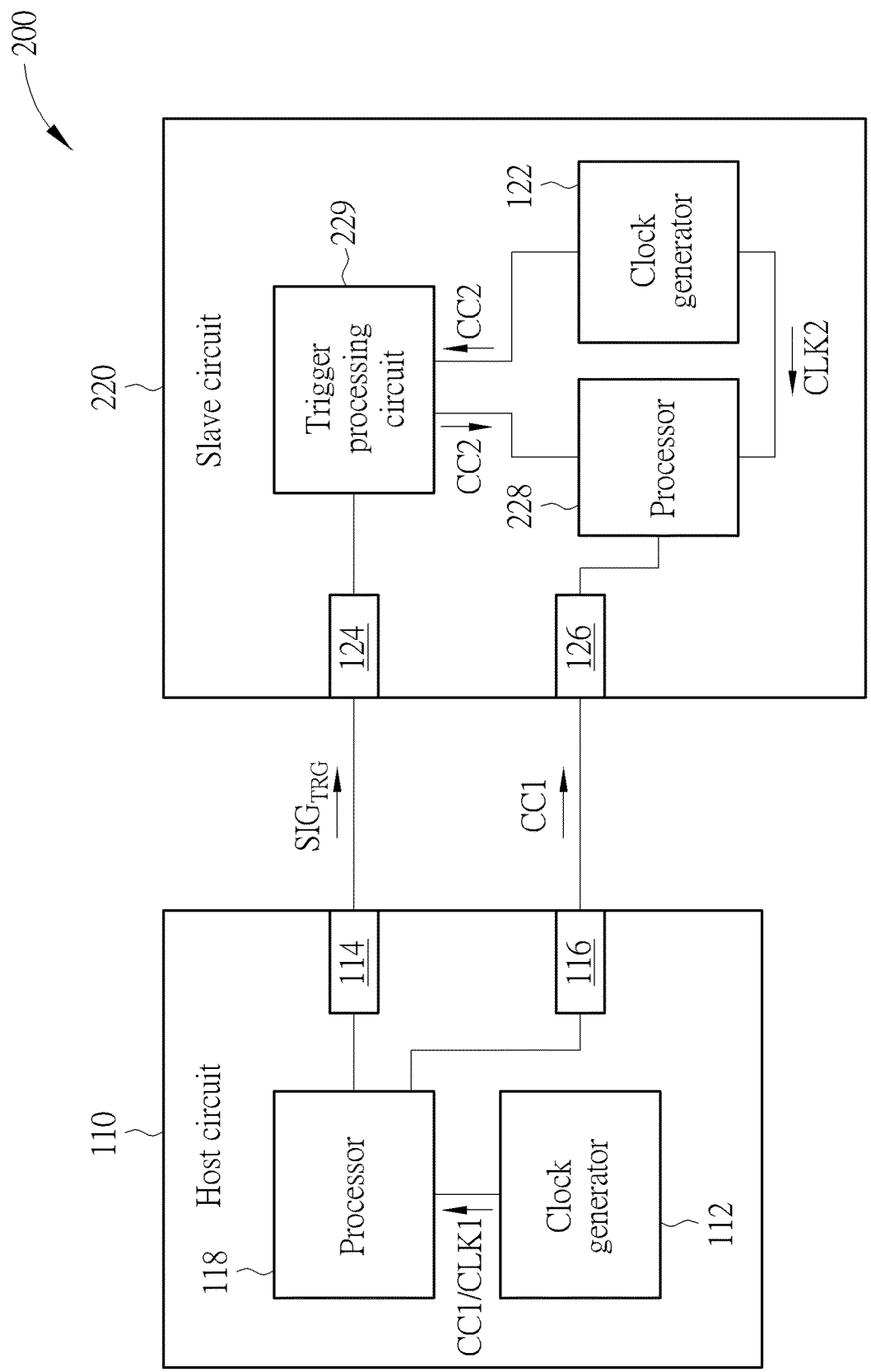
FIG. 2 is a schematic diagram of a clock synchronization system according to another embodiment of the present invention.

FIG. 2 is a schematic diagram of a clock synchronization system 200 according to another embodiment of the present invention. The clock synchronization system 100 and the clock synchronization system 200 have similar structures and can operate according to similar principles. However, the slave circuit 220 may further comprise a trigger processing circuit 229. The trigger processing circuit 229 can detect the signal edge of the trigger signal $SIG_{TRG}$, such as a rising edge or a falling edge. When the trigger processing circuit 229 detects the signal edge of the trigger signal $SIG_{TRG}$, the trigger processing circuit 229 can immediately capture the clock count CC2 from the clock generator 122, and the processor 228 can read the clock count CC2 from the trigger processing circuit 229. Since the slave circuit 220 can use the trigger processing circuit 229 to immediately respond to the trigger signal $SIG_{TRG}$, it can ensure that the clock counts CC1 and CC2 can correspond to very close real times.

Figure 3:
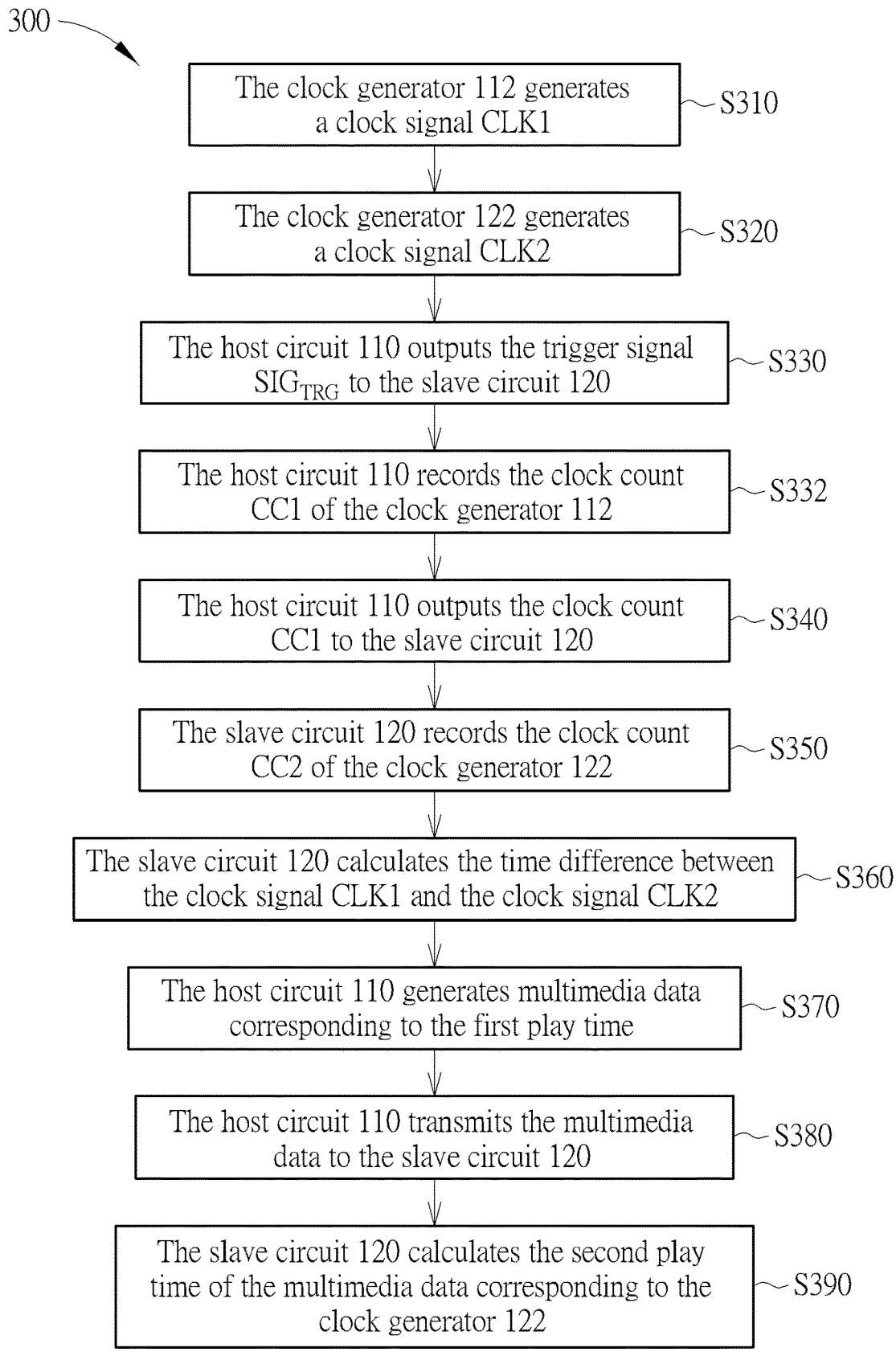
FIG. 3 is a flowchart of an operation method of the clock synchronization system in FIG. 1 according to an embodiment of the present invention.

FIG. 3 is a flowchart of an operation method 300 of the clock synchronization system 100 according to an embodiment of the present invention. The method 300 may comprise steps S310 to S390.

S310: The clock generator 112 generates a clock signal CLK1;

S320: The clock generator 122 generates a clock signal CLK2;

S330: The host circuit 110 outputs the trigger signal $SIG_{TRG}$ to the slave circuit 120;

S332: When the trigger signal $SIG_{TRG}$ is issued, the host circuit 110 simultaneously records the clock count CC1 of the clock generator 112;

S340: The host circuit 110 outputs the clock count CC1 to the slave circuit 120;

S350: When the slave circuit 120 receives the trigger signal $SIG_{TRG}$, the slave circuit 120 records the clock count CC2 of the clock generator 122;

S360: The slave circuit 120 calculates the time difference between the clock signal CLK1 and the clock signal CLK2 according to the clock count CC1 and the clock count CC2;

S370: The host circuit 110 generates multimedia data corresponding to the first play time;

S380: The host circuit 110 transmits the multimedia data to the slave circuit 120;

S390: When the slave circuit 120 receives the multimedia data, the slave circuit 120 calculates the second play time of the multimedia data corresponding to the clock generator 122 according to the time difference and the first play time.

Through the method 300, the slave circuit 120 in the clock synchronization system 100 can calculate the time difference between the clock signal CLK1 and the clock signal CLK2 according to the clock counts CC1 and CC2 at the same real time. Therefore, after receiving the multimedia data from the host circuit 110, the playback time of the multimedia data corresponding to the slave circuit 120 can be calculated. Therefore, it can be ensured that the host circuit 110 and the slave circuit 120 can play the corresponding multimedia data at the same time to synchronize image and sound. In addition, in some embodiments, the clock synchronization system 200 can also be performed by the method 300.

In summary, the clock synchronization system and the operation method of the clock synchronization system provided by the embodiments of the present invention can use the clock counts of the host circuit and the slave circuit at almost the same real time to calculate the time difference between the clock signals of the host circuit and the slave circuit. Therefore, although the host circuit and the slave circuit use different clock generators, the corresponding multimedia data can be output synchronously to synchronize the image and sound.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A clock synchronization system comprising:
   a host circuit comprising:
      a first clock generator configured to generate a first clock signal;
      a first input output interface;
      a first communication interface; and
      a first processor configured to:
         output a trigger signal through the first input output interface;
         record a first clock count of the first clock generator simultaneously when the trigger signal is issued; and
         output the first clock count from the first communication interface; and
   a slave circuit comprising:
      a second clock generator configured to generate a second clock signal;
      a second input output interface coupled to the first input output interface configured to receive the trigger signal;
      a second communication interface coupled to the first communication interface; and
      a second processor configured to:
         record a second clock count of the second clock generator when the trigger signal is received from the second input output interface; and
         calculate a time difference between the first clock signal and the second clock signal according to the first clock count and the second clock count.

2. The clock synchronization system of claim 1 wherein:
   the host circuit is further configured to generate multimedia data corresponding to a first play time, and transmit the multimedia data to the slave circuit; and
   the slave circuit is further configured to calculate a second play time of the multimedia data corresponding to the second clock generator according to the time difference and the first play time after receiving the multimedia data.

3. The clock synchronization system of claim 2 wherein:
   the second processor subtracts the first clock count from the second clock count to generate the time difference.

4. The clock synchronization system of claim 3 wherein:
   the second processor adds the time difference to the first play time to generate the second play time.

5. The clock synchronization system of claim 1 wherein:
   the first communication interface and the second communication interface are universal serial bus (USB) interfaces.

6. The clock synchronization system of claim 1 wherein:
   the first communication interface and the second communication interface are Inter-Integrated Circuit (I2C) interfaces.

7. The clock synchronization system of claim 1 wherein:
   the first communication interface and the second communication interface are universal asynchronous receiver transmitter (UART) interfaces.

8. The clock synchronization system of claim 1 wherein the first input output interface and the second input output interface are general purpose input/output (GPIO) interfaces.

9. The clock synchronization system of claim 1 wherein:
   the slave circuit further comprises a trigger processing circuit configured to detect a signal edge of the trigger signal, and when the signal edge is detected, capture the second clock count of the second clock generator; and
   the second processor reads the second clock count from the trigger processing circuit.

10. The clock synchronization system of claim 9 wherein:
    the signal edge is a rising edge or a falling edge.

11. The clock synchronization system of claim 1 wherein:
    the second processor enters an interrupt mode when receiving the trigger signal, and reads the second clock count from the second clock generator in the interrupt mode.

12. An operation method of a clock synchronization system, the clock synchronization system comprising a host circuit and a slave circuit, the host circuit comprising a first clock generator, the slave circuit comprising a second clock generator, the method comprising:
    the first clock generator generating a first clock signal;
    the second clock generator generating a second clock signal;
    the host circuit outputting a trigger signal to the slave circuit;
    when the trigger signal is issued, the host circuit simultaneously recording a first clock count of the first clock generator;
    the host circuit outputting the first clock count to the slave circuit;
    when the slave circuit receives the trigger signal, the slave circuit recording a second clock count of the second clock generator; and
    the slave circuit calculating a time difference between the first clock signal and the second clock signal according to the first clock count and the second clock count.

13. The method of claim 12 further comprising:
    the host circuit generating multimedia data corresponding to a first play time;
    the host circuit transmitting the multimedia data to the slave circuit; and
    the slave circuit calculating a second play time of the multimedia data corresponding to the second clock generator according to the time difference and the first play time after receiving the multimedia data.

14. The method of claim 13 wherein:
    the slave circuit calculating the time difference between the first clock signal and the second clock signal according to the first clock count and the second clock count comprises the second processor subtracting the first clock count from the second clock count to generate the time difference.

15. The method of claim 14 wherein:
    the slave circuit calculating the second play time of the multimedia data corresponding to the second clock generator according to the time difference and the first play time comprises the second processor adding the time difference to the first play time to generate the second play time.

16. The method of claim 12 further comprising:
    the slave circuit detecting a signal edge of the trigger signal; and
    when the signal edge is detected, the slave circuit capturing the second clock count of the second clock generator.

17. The method of claim 16 wherein:
    the signal edge is a rising edge or a falling edge.

18. The method of claim 12 further comprising:
the slave circuit entering an interrupt mode when receiving the trigger signal; and
the slave circuit reading the second clock count from the second clock generator in the interrupt mode.

\* \* \* \* \*